United States Patent [19]

Fite, Jr.

[11] Patent Number: 5,127,534
[45] Date of Patent: Jul. 7, 1992

[54] MOISTUREPROOF TOP FOR WELDING ROD CANS

[76] Inventor: Vernley A. Fite, Jr., 35880 Burning Tree Dr., Newark, Calif. 94560

[21] Appl. No.: 759,674

[22] Filed: Sep. 13, 1991

[51] Int. Cl.⁵ .............................................. B65D 51/18
[52] U.S. Cl. ................................. 220/254; 220/324; 220/334
[58] Field of Search ............... 220/254, 315, 324, 334, 220/343, 344, 908, 909

[56] References Cited

U.S. PATENT DOCUMENTS

| | | | |
|---|---|---|---|
| 2,565,939 | 8/1951 | Wriston | 220/344 X |
| 3,618,814 | 11/1971 | Nagroski | 220/908 X |
| 4,444,355 | 4/1984 | Cary | 220/908 X |
| 4,643,380 | 2/1987 | Copeland | 220/908 X |

*Primary Examiner*—Stephen Marcus
*Assistant Examiner*—Nova Stucker
*Attorney, Agent, or Firm*—Linval B. Castle

[57] ABSTRACT

To prevent deterioration of the flux coatings, welding rods are shipped by the manufacturer in hermetically sealed, containers that are usually destroyed when opened. The invention is for a reusable, sealable end cover, with hinged lid that is attachable to an opened container and permits continued use of the container without need to first remove the rods.

7 Claims, 1 Drawing Sheet

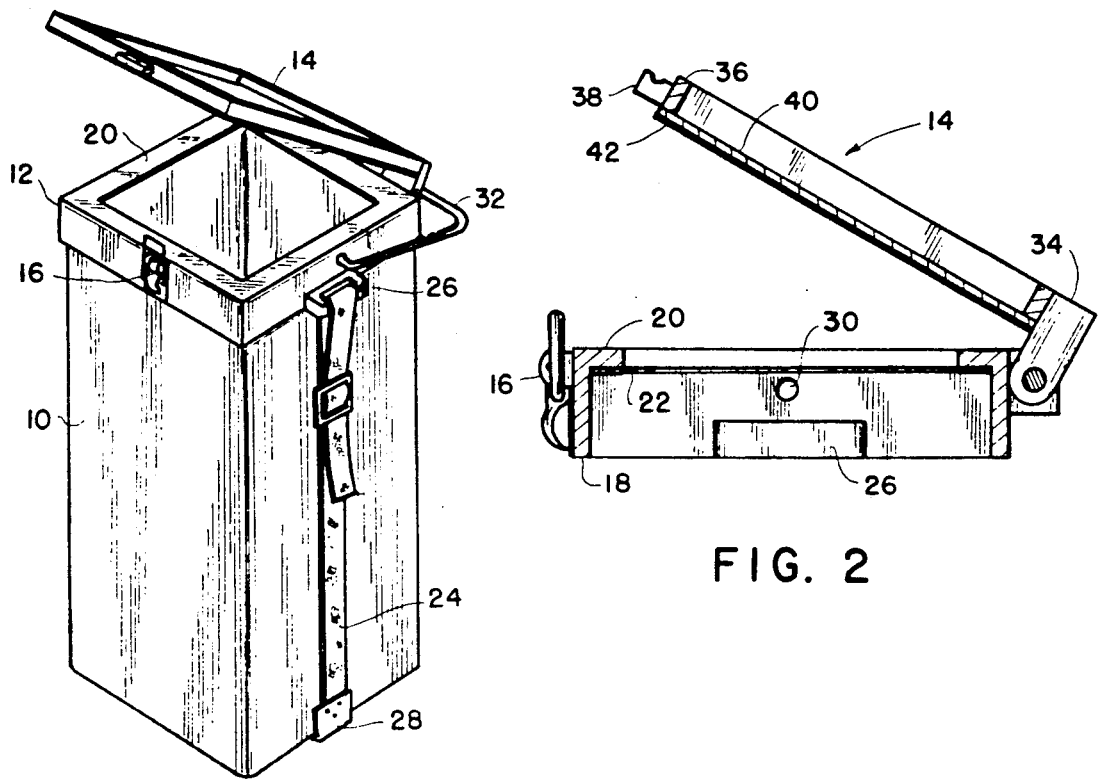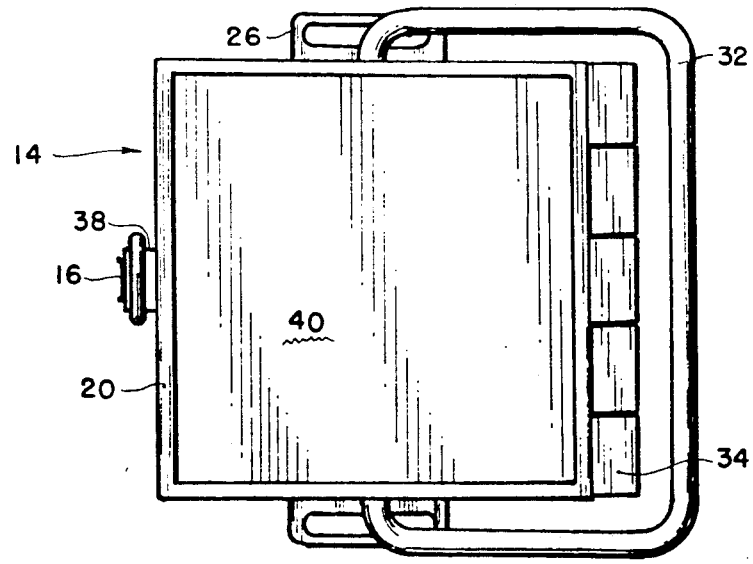

MOISTUREPROOF TOP FOR WELDING ROD CANS

BACKGROUND OF THE INVENTION

This invention relates to welding and particularly to a sealed top cover with dispensing door for application to a recently opened welding rod supply can for preventing the rapid deterioration from moisture of the flux on the rods.

Welding rods are generally provided with a dry flux coating of a type depending upon the particular welding process and the material to be welded. Because flux coatings rapidly deteriorate when exposed to the moisture in the air, the coated rods are supplied by the manufacturer in thin hermetically sealed metal containers which are easily cut or torched open by the user. After the flux coated rods are removed from the metal container the rods, now having been exposed to the air, are then usually stored in and dispensed from commercially available sealable plastic cylinders, often color coded to identify the type of rod and flux contained therein.

Most of the supply containers provided by the rod manufacturer are thin metal about fifteen inches in length and about a 6 by 6 inch square cross section with a recessed top or bottom end that is easily and neatly opened with a ordinary household can opener. With an end thus removed the container will still provide good rod storage if a moistureproof top can be added.

This invention is for a removable top which is sealed to the opened end of a flux rod can and which has its own hinged rod-dispensing cover. One important advantage of removing an end of a welding rod can and replacing that end with a moistureproof dispensing cover or top is that the closely packed flux coated rods within the can are not removed or disturbed and are not unnecessarily subjected to moist air.

DESCRIPTION OF THE DRAWINGS

In the drawings which illustrate the preferred embodiment of the invention:

FIG. 1 is perspective view of a flux coated welding rod can with a removable top;

FIG. 2 is a sectional side view of the removable top of the invention; and

FIG. 3 is a top plan view of the removable top.

DETAILED DESCRIPTION

Illustrated in FIG. 1 is a flux coated rod can 10 of a type supplied by the manufacturer. It is normally five and a half to six inches square, about fifteen inches long and, when delivered to the user, is hermetically sealed to prevent moisture from damaging the dry flux applied to the rods contained therein. A thin metal end of the container 10 can be easily removed and replaced with a removable top in the form of a frame 12 with a hinged lid 14 having an over-center lock 16 that may be released whenever it is desired to remove welding rods from the supply box.

Details of the top frame 12 and lid 14 are shown in the sectional view of FIG. 2 and includes a frame member 18 about 6¼ square to loosely fit over the open end of the rod container 10. The frame is formed of angle material so that it will extend vertically about 1¼ inch down the side of the container and will form about a ¾ inch horizontal platform 20 around the end edge of the container. The material of the frame 12 should be adequately strong to prevent its bending or warping, such as ¼ inch thick aluminum angle. Adhering to the bottom surface of the frame 12 beneath the horizontal platform 20 is a continuous strip of sealant 22, such as sponge rubber, which provides a moistureproof seal when the frame 12 is mounted on the open end of the container 10. The frame 12 is preferably tightly secured against the end of the container 10 by an elastic strap 24 which engages elongated loops 26 on each side of the frame 12 and passes around the closed opposite end of the container. If desired, two of such straps 24 may be used, each extending from an elongated loop 26 to a hook 28 that engages the bottom lip of the container.

If desired, a pair of bail holes 30 may be drilled through the opposite center sides of the frame 12, as shown in FIG. 2, for the installation of a heavy wire bail or handle 32.

Attached to the top frame 12 by hinges 34 located along one edge of the frame 12 is the lid 14 which, in the preferred embodiment, includes a square frame 36 of ¼ inch thick rectangular aluminum bar stock located to directly overlie the ¼ inch vertical sides of the top frame 12 when the lid is closed. A rectangular "hook" 38 for engagement with the over-center lock 16 on frame 12 is centered on the square frame 38 on the side opposite the hinges 34. Covering the surface of the square frame 36 adjacent the frame 12 is a thin metal sheet 40 with a continuous strip of sealant 42 such as sponge rubber around the outer edge to provide a moistureproof seal between the hinged lid 14 and the platform 20 around the frame 12 when the lid 14 is down and locked.

Having thus described the invention, what is claimed is as follows.

1. In combination with an elongated rectangular supply container for flux coated welding rods, a sealable top cover for application to the container after removal of a rectangular end, said top cover comprising:

an open frame member encircling the open rectangular end, said frame member having a top surface and a flat bottom surface for contact with the open end of said container;

means coupled to said frame member and to said container for urging tight contact between said flat bottom and said open end;

a lid attached by hinges to one exterior side of said open frame member and covering the entire top surface of said frame member; and locking means attached to said lid and to said frame member for releaseably maintaining said lid in tight contact with the top surface of said frame member.

2. The top cover claimed in claim 1 further including a sealant material adhering to the flat bottom surface of open frame member and interposed between said lid and the top surface of said frame member.

3. The top cover claimed in claim 1 wherein said open frame member is constructed of angle material formed to have a flat top frame surface and a side surface for encircling the end portion of the container.

4. The top cover claimed in claim 3 wherein said locking means includes an over-center lock attached to said side surface and positioned to engage a hook attached to said lid.

5. The top cover claimed in claim 4 further including a heavy wire carrying bail attached to said cover through holes in the opposite side surfaces of said frame member.

6. The top cover claimed in claim 5 wherein said lid is formed of a rectangular metal sheet with a supporting lid frame that overlies said open frame member.

7. The top cover claimed in claim 6 wherein said frame member further includes hooking means attached to opposite side surfaces of said frame member for engagement of a hold-down strap for urging tight contact between said top cover and said supply container.

* * * * *